(12) United States Patent
Sadikin et al.

(10) Patent No.: US 11,632,847 B2
(45) Date of Patent: Apr. 18, 2023

(54) LIGHTING DEVICE

(71) Applicant: SIGNIFY HOLDING B.V., Eindhoven (NL)

(72) Inventors: Mohammad Fal Sadikin, Eindhoven (NL); Shankaran Sandeep Kumar, Waalre (NL); Muhammad Mohsin Siraj, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/627,819

(22) PCT Filed: Jul. 14, 2020

(86) PCT No.: PCT/EP2020/069896
§ 371 (c)(1),
(2) Date: Jan. 18, 2022

(87) PCT Pub. No.: WO2021/009175
PCT Pub. Date: Jan. 21, 2021

(65) Prior Publication Data
US 2022/0272823 A1  Aug. 25, 2022

(30) Foreign Application Priority Data

Jul. 18, 2019 (EP) .................... 19186897

(51) Int. Cl.
*H05B 47/19* (2020.01)
*H05B 47/17* (2020.01)
*H05B 47/155* (2020.01)
*H05B 47/165* (2020.01)
*H04L 41/084* (2022.01)

(52) U.S. Cl.
CPC ........... *H05B 47/19* (2020.01); *H04L 41/084* (2013.01); *H05B 47/155* (2020.01); *H05B 47/165* (2020.01); *H05B 47/17* (2020.01)

(58) Field of Classification Search
CPC .... H05B 47/19; H05B 47/155; H05B 47/165; H05B 47/17; H04L 41/084; G08C 23/04; G08C 2201/93; G08C 17/02; G08C 2201/71; H04W 12/009
See application file for complete search history.

(56) References Cited

U.S. PATENT DOCUMENTS 7,948,438 B1  5/2011  Francis
9,072,133 B2  6/2015  Chemel et al.
(Continued)

FOREIGN PATENT DOCUMENTS

JP    H0294292 A     4/1990
JP    2010514320 A   4/2010
(Continued)

*Primary Examiner* — Daniel D Chang

(57) ABSTRACT

The invention relates to implementing a factory reset to a lighting device. Thereto, the invention provides a lighting device comprising: a directional wireless receiver configured to receive a message within a time period, wherein the message comprises at least one signal comprising a factory reset command from a user device; a controller configured to implement a factory reset of the lighting device if a respective signal of said at least one signal is received within a respective predefined angular range relative to the lighting device.

15 Claims, 2 Drawing Sheets

(56) References Cited

U.S. PATENT DOCUMENTS

| | | |
|---|---|---|
| 10,162,060 B2 | 12/2018 | Jaeckle |
| 2010/0091686 A1 | 4/2010 | Rutjes et al. |
| 2011/0119476 A1 | 5/2011 | Dai |
| 2011/0295389 A1 | 12/2011 | McCormack |
| 2012/0260076 A1 | 10/2012 | Liu et al. |
| 2013/0342131 A1 | 12/2013 | Recker et al. |
| 2014/0062297 A1 | 3/2014 | Bora et al. |
| 2014/0096253 A1 | 4/2014 | Garcia Morchon et al. |
| 2015/0341222 A1 * | 11/2015 | McCormack ....... H04L 61/5038 370/254 |

FOREIGN PATENT DOCUMENTS

| | | | |
|---|---|---|---|
| JP | 2012518357 A | 8/2012 | |
| JP | 2015197958 A | 11/2015 | |
| JP | 2017126436 A | 7/2017 | |
| JP | 2012506189 A | 3/2018 | |
| JP | 2018510480 A | 4/2018 | |
| WO | WO-2008078256 A2 * | 7/2008 | ......... H04L 41/0806 |
| WO | 2011007301 A1 | 1/2011 | |
| WO | 2012168888 A1 | 12/2012 | |
| WO | 2014040292 A1 | 3/2014 | |
| WO | 2015121781 A1 | 8/2015 | |
| WO | 2018036749 A1 | 3/2018 | |

\* cited by examiner

LIGHTING DEVICE

CROSS-REFERENCE TO PRIOR APPLICATIONS

This application is the U.S. National Phase application under 35 U.S.C. § 371 of International Application No. PCT/EP2020/069896, filed on Jul. 14, 2020, which claims the benefit of European Patent Application No. 19186897.5, filed on Jul. 18, 2019. These applications are hereby incorporated by reference herein.

FIELD OF THE INVENTION

The invention relates to implementing a factory reset to a lighting device. More specifically, the invention relates to a lighting device, a system, and a method of implementing a factory reset to a lighting device.

BACKGROUND OF THE INVENTION

Connected lighting refers to a system of one or more lighting devices (or: luminaires, or illumination sources) which are controlled not by (or not only by) a traditional wired, electrical on-off or dimmer circuit, but rather by using a data communications protocol via a wired or more often wireless connection, e.g. a wired or wireless network. A luminaire is a lighting device. Typically, the luminaire, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

There is an ongoing trend in the professional lighting market to move more towards connected lighting systems which enables features such as, for example, (remote) scheduling, energy monitoring, sensor based lighting control and asset management. In many cases these systems are installed in existing buildings, in which case a wireless network is preferred in order to avoid having to draw cables (for lighting control) through the ceiling. Examples of such wireless network protocols which are used widely in current practice are open standards like ZigBee, Thread, BLE mesh, Wi-Fi and various proprietary network implementations built on top of the IEEE 802.15.4, 802.15.1 or 802.11 standards.

Before the networked lighting system can be used the system first has to be commissioned, which means that all the relevant wireless luminaires are connected to a single network, and when so desired added to different groups and zones, each with their own behavior. In order to do this, the installer or commissioner must communicate with each individual luminaire and send it the appropriate commands to join the network and/or add it to these groups or zones.

This is currently implemented in two different ways. In the most basic case a controller box (or the first luminaire) is commanded to open a network which allows other luminaires to join this network. In many cases the wireless network in factory-new state will automatically start looking for an open network and then joins this network automatically (this is sometimes referred to as "auto-joining"). After this initial auto-joining stage the installer can start to form groups and zones in the network e.g. by doing a blink search. During this blink search the installer gives (more or less at random) a command to one or more luminaires to identify where they are and/or that they are by blinking. The installer then decides to which group or zone the luminaire(s) belong, and can decide at that point to add it to a specific group or not. The blinking could also be done by the system where the installer has to indicate where the luminaire is located on a map (e.g. on tablet) which implicitly assigns it to the relevant group(s). Alternatively, the installer uses a pointing device (e.g. an IR remote control or a flashlight) which sends a signal to a sensor in the luminaire to identify which luminaire should be added to a specific group during the commissioning process.

During this process a luminaire may end up in the wrong group of luminaires or wrong network. For example, a luminaire may be placed in the wrong group or wrong network if multiple groups or networks are used throughout the building and several installers are working in parallel. There may also be other wireless networks (in 'open' state) in the building for other purposes (e.g. HVAC). For this reason most existing systems offer a method to send a 'factory reset' command which effectively resets the network configuration inside the luminaire and makes it possible for that luminaire to become part of a different network instead (and to retry the commissioning steps by letting the luminaire search for an open network again).

Factory reset is an important feature to recover a default state of a wireless device. Namely: Factory reset may allow a legitimate user of the wireless device to easily reconfigure said device; re-create a new network; handover the wireless device to another entity; or even recover control in case of unexpected behavior, such as an erroneous configuration due to a human error or due to a cyber-attack. However, a malicious user (or: attacker) may also be able to abuse factory reset to perform malicious activities, such as taking over the control of the device from a legitimate user, or such as reconfiguring the wireless device to join a malicious network created by the malicious user.

Hence, previous methods for implementing a factory reset to a lighting device (such as e.g. a luminaire) are disadvantageous because they are unsecure and thereby allow malicious users (e.g. attackers of a wireless network) to disrupt the operation of the lighting device or affect a system and/or network comprising such a lighting device.

SUMMARY OF THE INVENTION

It is an object of the invention to provide an improved lighting device, which at least alleviates the problems and/or disadvantages mentioned above related to implementing a factory reset to a lighting device. Thereto, the invention provides a lighting device comprising: a directional wireless receiver configured to receive a message within a time period, wherein the message comprises at least one signal comprising a factory reset command from a user device; a controller configured to implement a factory reset of the lighting device if a respective signal of said at least one signal is received within a respective predefined angular range relative to the lighting device.

Said directional wireless receiver is configured to receive a message within a time period. The message comprises at least one signal comprising the factory reset command from the user device. Because the controller of the lighting device implements the factory reset of the lighting device only if a condition is determined in which a respective signal of said at least one signal (comprising the factory reset command from the user device) is received within a respective predefined angular range relative to the lighting device, the present invention advantageously provides a constraint (or: a first security condition) in implementing the factory reset of the lighting device. Such a constraint facilitates a legitimate user, and impedes a malicious user, in performing a factory reset of said lighting device.

For example: The lighting device may comprise a particular predefined angular range relative to the lighting device for receiving a factory reset command. Such a predefined angular range may be expressed in polar coordinates. A user device may transmit a message within a time period to the lighting device. Said message may comprise a signal comprising the factory reset command. Then, the factory reset of the lighting device may only be implemented if said signal (comprising the factory reset command from the user device) is received by the directional wireless receiver within said particular predefined angular range relative to the lighting device. A legitimate user knowing said constraint in predefined angular range relative to the lighting device may therefore perform a factory reset, or at least be facilitated to perform said factory reset; while a malicious user (or: attacker) not knowing said constraint may not perform said factory reset, or at least be impeded to perform said factory reset.

Said user device may e.g. be a remote control, a smartphone, a tablet, a portable device, or a wearable device. Said predefined angular range may be a default feature of the lighting device, e.g. programmed into the controller of the lighting device during manufacturing, commissioning and/or configuring said lighting device. Said programming may e.g. be done only once. Said predefined angular range may alternatively be provided by the legitimate user during installation and/or configuration of said lighting device.

In aspects: Albeit the invention is embodied with a lighting device, the present application may also be applied to any other node or device within a wireless network, such as e.g. sensors, bridges, actuators, etc.

Furthermore, the directional wireless receiver may for example be a phase array antenna. The message comprising the at least one signal may for example be detected by means of commonly known Phase of Arrival (PoA) and/or Time of Arrival (ToA) techniques.

In an embodiment, the message comprises only a single signal comprising the factory reset command from the user device; wherein the controller may be configured to implement the factory reset of the lighting device if said single signal is received within a first predetermined angular range relative to the lighting device. Since only a single signal comprising the factory reset command from the user device is required to be received within a first predetermined angular range relative to the lighting device, such an embodiment advantageously provides both a secure and ergonomic constraint for implementing a factory reset of the lighting device.

However, in other examples, a more sophisticated and consequently more secure constraint for implementing said factory reset of the lighting device may further be provided. Hence, in an embodiment, the message comprises a sequence of signals comprising the factory reset command from the user device; wherein the controller may be configured to implement the factory reset of the lighting device if each respective signal of said sequence of signals is received within the respective predefined angular range relative to the lighting device and according to a predefined sequence of said predefined angular ranges. Therefore, the lighting device may not only require receiving said sequence of signals comprising the factory reset command within a respective predefined angular range relative to the lighting device, but also require receiving said sequence of signals according to a predefined sequence of said predefined angular ranges. Such an embodiment provides a more secure constraint for implementing a factory reset of the lighting device. Namely, for example, an attacker has to know the respective predefined angular range in which to transmit each signal of a sequence of signals comprising the factory reset command, but the attacker also has to know the predetermined sequence in which to transmit said sequence of signals. In an aspect, for example, each consecutive signal of said sequence of signals may comprise a same predefined angular range relative to the lighting device.

In an embodiment, each consecutive signal of said sequence of signals may comprise a different predefined angular range relative to the lighting device. Such a differing consecutive signal may add more complicated constraints, hence security for implementing the factory reset of the lighting device.

Moreover, for example, even if a malicious user (or: attacker) may have the knowledge of said predefined sequence of said predefined angular ranges, the malicious user has to be in the vicinity of the lighting device in order to physically move into different positions and/or orientations relative to the lighting device; which makes fulfilling the conditions for implementing factory more difficult if not in the vicinity of the lighting device, e.g. an attacker standing outside a building with a high power radio sender can often only send a signal in one angular range from which he has access to the building, and has to move around the whole building to find another angular range from which to send a signal.

In an embodiment, the lighting device may comprise a light source for emitting a lighting characteristic; wherein the controller may be configured to adapt the lighting characteristic of said light source for each instance the respective signal of said sequence of signals is received within the respective predefined angular range relative to the lighting device and according to the predefined sequence of said predefined angular ranges.

Similarly, in an additional or alternative aspect, the lighting device may comprise a light source for emitting a lighting characteristic; wherein the controller may be configured to adapt the lighting characteristic of said light source for each instance the respective signal of said sequence of signals is received outside the respective predefined angular range relative to the lighting device and/or not according to the predefined sequence of said predefined angular ranges.

Such embodiments are advantageous, because the lighting device provides visual feedback to a user whether each signal of said sequence of signals is transmitted within to the required predetermined angular range or not. In an embodiment, the lighting characteristic may be one of: color, color temperature, light intensity, and/or light pattern.

For example, a green light may be emitted if an instance of the respective signal of said sequence of signals is received within the respective predefined angular range relative to the lighting device and according to the predefined sequence of said predefined angular ranges; while a red light may be emitted if an instance of the respective signal of said sequence of signals is received outside the respective predefined angular range relative to the lighting device and/or not according to the predefined sequence of said predefined angular ranges.

In an aspect, the lighting device may comprise a factory reset function for factory resetting the lighting device; wherein the controller may be configured to block said factory reset function if for an instance the respective signal of said sequence of signals is received outside the respective predefined angular range relative to the lighting device and/or not according to the predefined sequence of said predefined angular ranges. Additionally, the lighting device may comprise a light source for emitting a lighting characteristic, wherein the lighting characteristic may be indicative of a blocked factory reset function (when said blocking of the factory reset function occurs). Alternatively, said 'for an instance' may be 'for a multiple instances exceeding a threshold value', wherein the threshold value may be two, three, four, five, or at least six.

In an aspect, the lighting device may comprise a transmitter; wherein the controller may be configured to transmit a warning signal to another device if for an instance the respective signal of said sequence of signals is received outside the respective predefined angular range relative to the lighting device and/or not according to the predefined sequence of said predefined angular ranges. Alternatively, said 'for an instance' may be 'for a multiple instances exceeding a threshold value', wherein the threshold value may be two, three, four, five, or at least six.

In an embodiment, the lighting device may further comprise a transmitter, wherein the controller may be configured to randomly generate said respective predefined angular range relative to the lighting device and/or said predefined sequence of said predefined angular ranges (which are the requirements for the above mentioned condition for implementing the factory reset of the lighting device), wherein the controller is configured to transmit with the transmitter said randomly generated respective predefined angular range relative to the lighting device and/or said predefined sequence of said predefined angular ranges to a user device.

Hence, as partly mentioned before, the time period is the period of time for receiving at least one signal comprising a factory reset command. Said period of time may be any time period. However, in an embodiment, the time period may be one of: one second, two seconds, four seconds, six seconds, at most four seconds, at most ten seconds, or at most twelve second. Such a time period provides an additional constraint to performing the factory reset.

The invention may also provide a distance constraint in performing a factory reset of the lighting device, in addition to the angular constraint mentioned above. The distance of a user device to the lighting device may be measured by a RSSI value of the transmitted message and/or signals. Hence, in an embodiment, each respective signal of said at least one signal may comprise a respective RSSI value; wherein the controller may be configured to implement the factory reset of the lighting device if each of said respective RSSI value is above a predefined threshold value.

In an embodiment, the directional wireless receiver may be configured to receive the message via ZigBee, Bluetooth, RF, IR, Lo-Ra, UWB, RFID, NFC, Wi-Fi, VLC, and/or Li-Fi.

In an embodiment, the factory reset command may comprise a unique factory reset code associated with the lighting device.

In an embodiment, the lighting device may comprise a housing, wherein the housing comprises a physical indicator indicative of the respective predefined angular range relative to the lighting device required for implementing the factory reset. Such a physical indicator may therefore advantageously serve as a reference to the legitimate user in performing said factory reset of the lighting device. In examples, said physical indicator may e.g. be a logo, e.g. printed on the lighting device. Said physical indicator may be an e-paper display.

In an embodiment, the directional wireless receiver may be configured to receive an initialization message; wherein the controller may be configured to start the time period upon the directional wireless receiver receiving said initialization message. The message and the initialization message may for example be transmitted from a same user device.

In an embodiment, the lighting device may comprise a transmitter configured to transmit a factory reset message comprising a factory reset command to at least one further lighting device within a wireless network; wherein the controller may be configured to transmit the factory reset message to the at least one further lighting device within the wireless network upon implementing the factory reset of the lighting device.

It is a further object of the invention to provide an improved system for implementing a factory reset to a lighting device. Thereto, the invention further provides a system comprising: the lighting device according to any one of the preceding claims, and a user device for providing said message comprising the at least one signal comprising a factory reset command. Thereby, advantages and/or embodiments applying to the lighting device according to the invention may mutatis mutandis apply to said system according to the invention.

It is a further object of the invention to provide an improved method of implementing a factory reset to a lighting device. Thereto, the invention further provides, a method of implementing a factory reset to a lighting device, wherein the method comprises: receiving a message within a time period, wherein the message comprises at least one signal comprising a factory reset command from a user device; implementing a factory reset of the lighting device if a respective signal of said at least one signal is received within a respective predefined angular range relative to the lighting device. Thereby, advantages and/or embodiments applying to the lighting device and/or system according to the invention may mutatis mutandis apply to said method according to the invention.

In an embodiment, the message comprises only a single signal comprising the factory reset command from the user device, wherein the method comprises: implementing the factory reset of the lighting device if said single signal is received within a first predetermined angular range relative to the lighting device.

In an embodiment, the message comprises a sequence of signals comprising the factory reset command from the user device, wherein the method comprises: implementing the factory reset of the lighting device if each respective signal of said sequence of signals is received within the respective predefined angular range relative to the lighting device and according to a predefined sequence of said predefined angular ranges.

The invention further relates to a computer program product. Hence, the invention provides a computer program product for a computing device, the computer program product comprising computer program code to perform the method(s) according to the invention when the computer program product is run on a processing unit of the computing device. Thus, aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

As mentioned before, in aspects, albeit the invention is embodied with a lighting device, the present application may also be applied to any other node or device within a wireless network, such as e.g. sensors, bridges, actuators, etc.

Hence, in a further aspect, the invention may provide a device comprising: a directional wireless receiver configured to receive a message within a time period, wherein the message comprises at least one signal comprising a factory reset command from a user device; a controller configured to implement a factory reset of the device if a respective signal of said at least one signal is received within a respective predefined angular range relative to the device. Said device may be a lighting device, a sensor, an actuator, a bridge, a wireless network node, an electronic device, or a communication device. Thereby, advantages and/or embodiments applying to the lighting device and/or system according to the invention may mutatis mutandis apply to said further aspect according to the invention.

BRIEF DESCRIPTION OF THE DRAWINGS

The invention will now be further elucidated by means of the schematic non-limiting drawings.

DETAILED DESCRIPTION

As mentioned, factory reset is an important feature to recover a default state of a wireless device, such as e.g. a lighting device or another wireless network node. Previous methods for implementing a factory reset of a lighting device may not be secure due to the omission of security measures. This is disadvantageous. For example: The possibility that malicious persons may factory reset an unsecured lighting device without much effort, and thereby e.g. remove a lighting device from a wireless network, may affect the correct functioning of said wireless network and lighting device (e.g. the lighting device cannot transmit signals to other nodes in the network and cannot receive any control signals from other nodes in the network). For these reasons, amongst others, it is an objective that a 'factory reset command' or 'factory reset code' cannot be communicated to the luminaire by unauthorized people, or at least that the unauthorized people are impeded to do so.

Embodiments of the present invention provide security to a lighting device by imposing security conditions for factory resetting the lighting device, which ensure that only authorized people knowing said security conditions are able to perform a factory reset of the lighting device. Thereby, said security conditions relate to receiving a factory reset command within a respective predefined angular range relative to the lighting device, and in further embodiments receiving said factory reset command with a respective RSSI value above a predetermined threshold value.

Figure 1:
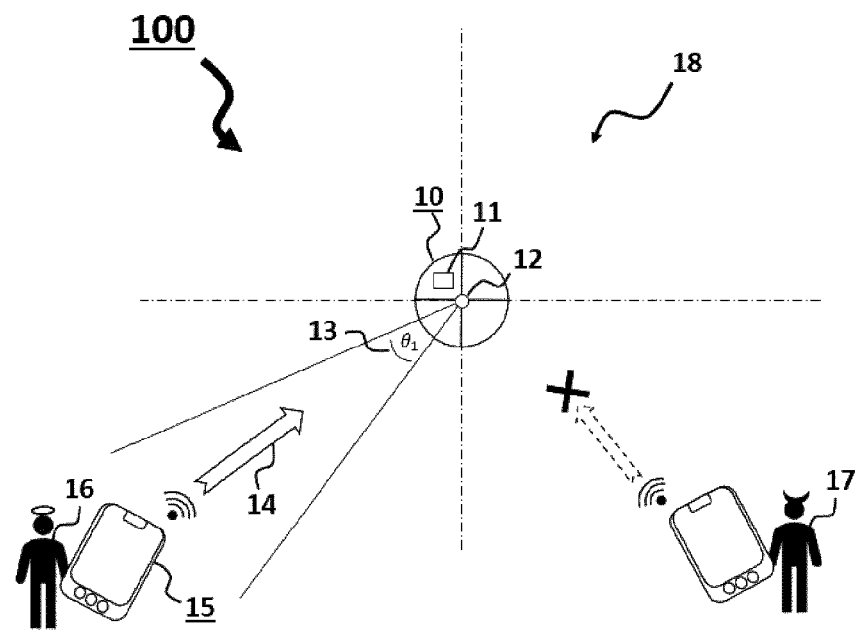
FIG. 1 depicts schematically an embodiment of a system according to the invention, wherein the system comprises a lighting device and a user device.

FIG. 1 depicts schematically, by non-limiting example, an embodiment of a system 100 according to the invention. The system 100 comprises a lighting device 10 and a user device 15 according to the invention. The lighting device 10 is a luminaire. The user device 15 is a smartphone.

The system 100 is implemented in a space 18. The space 18 comprises a wireless lighting network (not depicted). The lighting device 10 forms part of said wireless lighting network. Here, the space 18 is a domestic property. The space 18 also hosts users 16, 17 with user devices. Here, the space 18 hosts an authorized user 16 associated with the user device 15 and a malicious user 17 associated with another user device (not referenced).

Alternatively, the space 18 may be an indoor space, such as a house, a room, a domestic area, an office, a floor, a vehicle, etc. The space may yet alternatively be an outdoor space, such as a park, a square, a street, a garden, a sports venue, an outdoor festival, a construction site, etc. Alternatively, the user device 15 may be a mobile device, a portable device, a personal digital assistants, a pager, a smartwatch, a wearable device, a tablet, a dongle, a laptop, a remote control, a smart glass, a drone, etc.

Referring to FIG. 1, the lighting device 10 comprises a controller 11 and a directional wireless receiver 12. The directional wireless receiver 12 is a Bluetooth receiver, but may alternatively be a receiver operating with at least one of the modalities of: ZigBee, RF, IR, Lo-Ra, UWB, RFID, NFC, Wi-Fi, VLC, and/or Li-Fi. The directional wireless receiver 12 receives a message 14 within a time period. The time period is here one second, but may alternatively be any other time period being at most two seconds. The message 14 is transmitted by the user device 15 of the authorized user 16 and comprises a single signal comprising a factory reset command. This factory reset command may comprise a unique factory reset code associated with the lighting device. Similarly, the user device associated with the malicious user 17 may also transmit a message comprising a factory reset command. In alternative examples, said directional wireless receiver is configured to receive an initiation message starting said time period (for factory resetting said lighting device).

The controller 11 comprises a preset of a predefined angular range 13 relative to the lighting device 10. The predefined angular range, i.e. the preset, may be installed during manufacturing of the lighting device 10 (as a default parameter). Alternatively, the predefined angular range may be commissioned (i.e. defined) later by e.g. the authorized user 16. This angular range may be expressed in any angle or angular range, for example expressed in cartesian or polar coordinates. Here, the predefined angular range 13 is defined as angle theta-one and the angular range it defines (schematically).

Still referring to FIG. 1, the controller 11 implements a factory reset of the lighting device 10 if the message 14 comprising the single signal comprising the factory reset command (which can either be the message of the authorized user 16 or the malicious user 17) is received within said respective predefined angular range 13 relative to the lighting device 10. Hence, because the message 14, which is transmitted from the user device 15 and associated with the authorized user 16, is received within the respective predefined angular range 13 relative to the lighting device 10, the controller 11 implements the factory reset of the lighting device 10.

Since the message of the user device associated with the malicious user 17, which comprises a factory reset command, is not received within said predetermined angular range 13, e.g. because the malicious user 17 does not know said predefined angular range 13, the controller 11 does not implement a factory reset of the lighting device 10 upon the wireless directional receiver receiving said message (originating from the malicious user).

Therefore, the present invention advantageously provides a constraint (or: a first security condition) in implementing the factory reset of the lighting device 10. Such a constraint facilitates the authorized user 16, and impedes the malicious user 17, in performing the factory reset of said lighting device 10.

Furthermore, as mentioned, the directional wireless receiver may for example be a phase array antenna. Said phase array antenna may determine the angle of arrival of the message and/or the at least one signal. The general concept of using antenna arrays to detect the angle of received signal as well as to detect the location of a wireless transmitter has been maturely developed in the wireless positioning technology. Phase of Arrival (PoA) use antenna arrays (at the receiver side) to estimate the distance between the transmitter and the receiver, as well as the angle at which the transmitted signal impinges on the receiver by exploiting the phase or phase difference of carrier signal. For example, the antenna array with certain distance (D) can calculate the angle (theta) of incident wave front by measuring the phase difference received by each antenna. The consequence of PoA is that the Line of Sight is mandatory for accurate performance. However, this consequence gives a clear benefit for providing more security to implementing a factory reset, as in the present application. Additionally, and/or alternatively, the directional wireless receiver may use any other technique known in the art to detect if the respective signal of said at least one signal is received within a respective predefined angular range relative to the lighting device.

Furthermore, the present invention may also be based on several Time-of-Arrival (ToA) concepts. In ToA, the distance between the sender and receiver of a signal can be determined using the measured signal propagation time and the known signal velocity. For example, sound waves travel 343 m/s (in 20 degrees Celsius), that is, a sound signal takes approximately 30 ms to travel a distance of 10 m. In contrast, a radio signal travels at the speed of light (about 300 km/s), that is, the signal requires only about 30 ns to travel 10 m. The consequence is that radio-based distance measurements require clocks with high resolution, adding to the cost and complexity of a wireless device. The one-way time of arrival method measures the one-way propagation time, that is, the difference between the sending time and the signal arrival time is calculated by the receiver. For one-way measurements, the distance between two nodes i and j can be determined as: $Dist(i,j)=(t2-t1)*v$. Here, t1 and t2 are the sending and receive times of the signal (measured at the sender and receiver, respectively) and v is the signal velocity. Similarly, for the two-way approach, the distance is calculated as: $Dist(i,j)=0.5*((t4-t1)(t3-t2))*v$. Here, t3 and t4 are the sending and receive times of the response signal. Note that with one-way localization, the receiver node calculates its location, whereas in the two-way approach, the sender node calculates the receiver's location. In the present application, both of ToA localization techniques may be used to detect the message and/or the at least one signal.

In an embodiment, not depicted, but similar to the system depicted in FIG. 1, the lighting device 10 comprises a housing. The predefined angular range 13 is installed within the controller 11 during manufacturing of the lighting device 10. The housing thereby comprises a physical indicator indicative of the respective angular range 13 relative to the lighting device 10, which is required to implement said factory reset. The physical indicator is a textured area applied to a surface of the housing, but may alternatively be a protrusion, a sticker, a company logo, a color indicator, an aperture and/or a notch, and/or an e-paper display.

Figure 2:
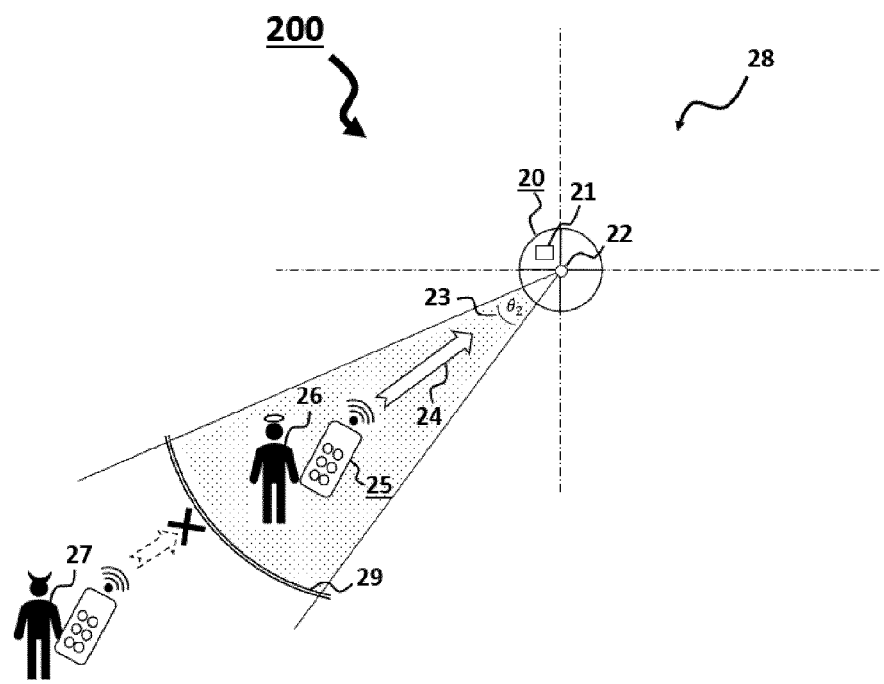
FIG. 2 depicts schematically another embodiment of a system according to the invention, wherein the system comprises a lighting device and a user device.

FIG. 2 depicts schematically, by non-limiting example, an embodiment of a system 200 according to the invention. The system 200 comprises a lighting device 20 and a user device 25 according to the invention. The lighting device 20 is a smart light bulb. The user device 25 is a remote control, but may alternative be another user device. The system 200 is implemented in a space 28. The space 28 is a shop. The shop 28 hosts an authorized user 26 and a malicious user 27. The smart light bulb 20 forms part of a wireless network (not depicted) within said shop 28.

The smart light bulb 20 comprises a controller 21 and a directional wireless receiver 22. The directional wireless receiver 22 is a Zigbee receiver, but may alternatively be a receiver operating with at least one of the modalities of: Bluetooth, RF, IR, Lo-Ra, UWB, RFID, NFC, Wi-Fi, VLC, and/or Li-Fi. The directional wireless receiver 22 receives a message 24 within a time period. The time period is here one second, but may alternatively be any other time period being at most two seconds. The message 24 is transmitted by the user device 25 of the authorized user 26 and comprises a single signal comprising a factory reset command. The message 24 and/or corresponding single signal further comprise a RSSI value. The remote control associated with the malicious user 27 may similarly transmit a similar message.

The controller 21 comprises a preset of a predefined angular range 23 relative to the smart light bulb 20. The predefined angular range 23 is defined as the angular range theta-two schematically depicted in FIG. 2. The controller 21 further comprises a predefined threshold value 29 (in terms of RSSI) for a message comprising a factory reset command. The predefined threshold value 29 is thereby indicative of a distance relative to the smart light bulb 20 from within a message comprising the factory reset command ought to be received for performing a factory reset of the smart light bulb 20.

Still referring to FIG. 2, the controller 21 implements a factory reset of the smart light bulb 20 if the message 24 comprising the single signal comprising the factory reset command is received within said respective predefined angular range 23 relative to the lighting device 20; and if the RSSI value of said message 24 is above the predefined threshold value 29 (i.e. a user device is within range of the smart light bulb 20).

The message 24 of the authorized user 26 and a message of the malicious user 27 both meet the condition of being received within the predefined angular range 23, as schematically depicted in FIG. 2. However, only the message 24 originating from the authorized user 26 meets the condition of the RSSI value of said message being above the predefined threshold value 29 (i.e. only the remote control 25 of the authorized user 26 is within range of the smart light bulb 20). Therefore, upon receiving the message 24 of the authorized user 26 within said respective predefined angular range 23 relative to the smart light bulb 20 and with a RSSI value above the predefined threshold value, the controller 21 performs a factory reset of the smart light bulb 20.

Thus, the present invention advantageously provides a first constraint and a second constraint (or: a first security condition and a second condition) in implementing the factory reset of the lighting device 20. Such a constraint facilitates the authorized user 26, and impedes the malicious user 27, in performing the factory reset of said lighting device 20.

Figure 3:
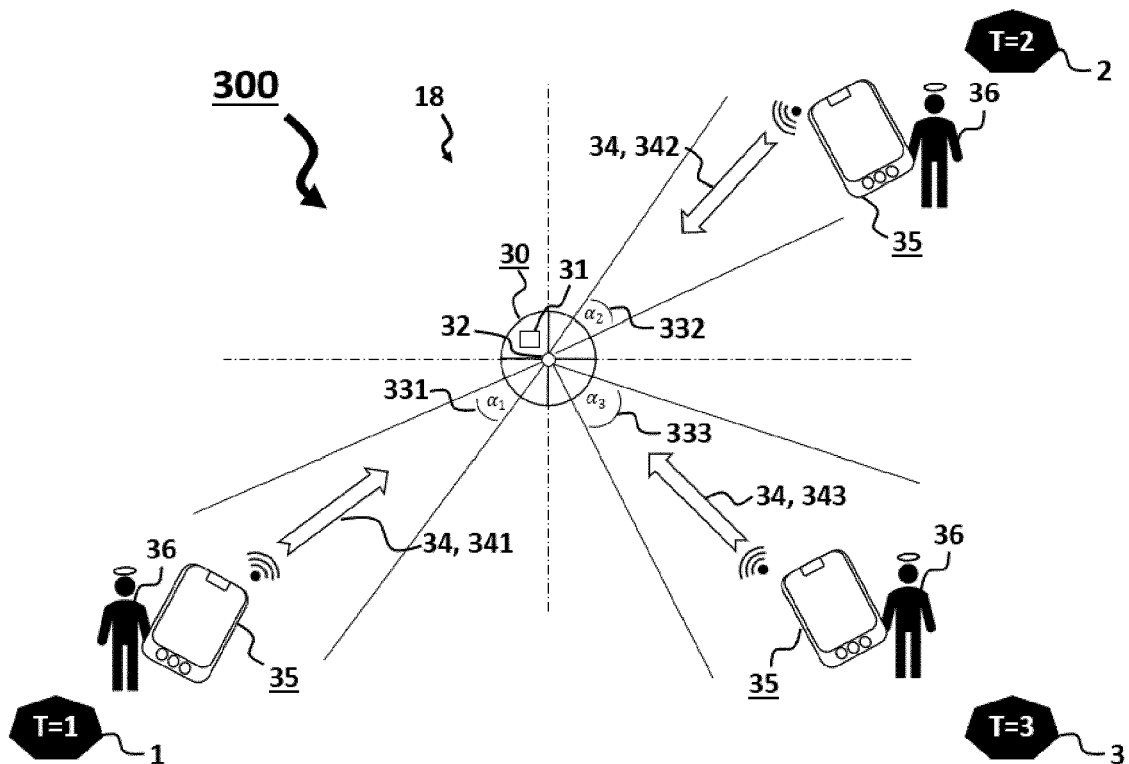
FIG. 3 depicts schematically another embodiment a system according to the invention, wherein the system comprises a lighting device and a user device.

FIG. 3 depicts schematically, by non-limiting example, an embodiment of a system 300 according to the invention. The system 300 comprises a lighting device 30 and a user device 35 according to the invention. The lighting device 30 is a luminaire. The user device 35 is a smartphone, but may alternative be another user device. The system 300 is implemented in a space 38. The space 38 is an office floor. The luminaire 30 forms part of a wireless network (not depicted) within said office floor. The wireless network comprises a plurality of other wirelessly connected luminaires.

Referring to FIG. 3, the lighting device 30 comprises a controller 31 and a directional wireless receiver 32. The directional wireless receiver 32 is a Bluetooth receiver, but may alternatively be a receiver operating with at least one of the modalities of: ZigBee, RF, IR, Lo-Ra, UWB, RFID, NFC, Wi-Fi, VLC, and/or Li-Fi. The directional wireless receiver 32 receives a message 34 within a time period. The message 34 is transmitted by the user device 35 of the authorized user 36 and comprises a first signal 341, a second signal 342, and a third signal 343 all comprising a factory reset command. The time period is here one second, but may alternatively be any other time period being at most two seconds. Within said time period, there are three moments in time 1, 2, 3 at which the first signal 341, the second signal 342 and the third signal 343 of the message 34 are respectively transmitted and subsequently received by the directional wireless receiver 32. Hence, the message 34 comprises a sequence of signals 341, 342, 343 comprising the factory reset command from the user device 35; The factory reset command comprises a unique factory reset code associated with the luminaire 30. In alternative examples, said directional wireless receiver is configured to receive an initiation message starting said time period (for factory resetting said lighting device).

The controller 31 comprises a preset of three predefined angular ranges 331, 332, 333 relative to the lighting device 30. Furthermore, the controller 31 comprises a predefined sequence of said predefined angular ranges 331, 332, 333. The sequence is: receiving a respective signal with a factory reset command consecutively within the first angular range 331, the second angular range 332 and the third angular range 333.

Each predefined angular range 331, 332, 333 and/or predefined sequence of said predefined angular ranges 331, 332, 333 (i.e. the preset) may be installed during manufacturing of the lighting device 10 (as a default parameter). Alternatively, the predefined angular range may be commissioned (i.e. defined) later by e.g. the authorized user. The respective angular range 331, 332, 333 may be expressed in any angle or angular range, for example expressed in cartesian or polar coordinates. Here, the predefined angular ranges 331, 332, 333 are defined respectively as angle alfa-one, alfa-two, alfa-three and the angular range it defines (schematically).

Still referring to FIG. 3, the controller 31 implements a factory reset of the lighting device 30 if the message 34 comprising said sequence of three signals 341, 342, 343 is received within the respective predefined angular range 331, 332, 333 relative to the lighting device 30 and according to said predefined sequence of said predefined angular ranges 331, 332, 333. Here, this condition for implementing a factory reset command is met, because: the first signal 341 is received at the first moment in time 1, the second signal 342 is received at the second moment in time 2, and the third signal 343 is received at the third moment in time 3. Hence, the controller 11 implements the factory reset of the lighting device 10 upon receiving said message 34.

This embodiment provides a more secure constraint for implementing a factory reset of the lighting device 30. Namely, for example, an attacker has to know the respective predefined angular range 331, 332, 333 in which to transmit each signal of a sequence of signals 341, 342, 343 comprising the factory reset command, but the attacker also has to know the predetermined sequence in which to transmit said sequence of signals 341, 342, 343.

In an embodiment (not depicted), which is similar to the embodiment depicted in FIG. 3, but wherein the lighting device 30 further comprises a light source and a transmitter. The controller 31 thereby adapts the intensity (or alternatively any other lighting characteristic such as e.g. hue or modulation) of the light source for each instance that the respective signal of said sequence of signals 341, 342, 343 is received within the respective predefined angular range 331, 332, 333 relative to the lighting device 30 and according to the predefined sequence of said predefined angular ranges 331, 332, 333. Moreover, upon factory resetting the lighting device 30, the lighting device 30 is configured to transmit a factory reset message comprising a factory reset command to at least one further lighting device within said wireless network, thus to any other wirelessly connected luminaires within the wireless network.

Figure 4:
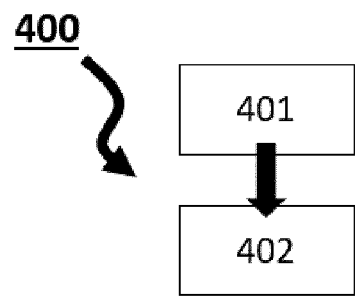
FIG. 4 depicts schematically a method according to the invention.

FIG. 4 depicts schematically, by non-limiting example, a method 400 of implementing a factory reset to a lighting device according to the invention. The method comprises a step 401 of receiving a message within a time period, wherein the message comprises at least one signal comprising a factory reset command from a user device. The method further comprises a step 402 of implementing a factory reset of the lighting device if a respective signal of said at least one signal is received within a respective predefined angular range relative to the lighting device.

In a further embodiment, the message comprises only a single signal comprising the factory reset command from the user device, wherein the method comprises: implementing the factory reset of the lighting device if said single signal is received within a first predetermined angular range relative to the lighting device.

Alternatively, in a further embodiment, the message comprises a sequence of signals comprising the factory reset command from the user device, wherein the method comprises: implementing the factory reset of the lighting device if each respective signal of said sequence of signals is received within the respective predefined angular range relative to the lighting device and according to a predefined sequence of said predefined angular ranges.

The invention claimed is:

1. A lighting device comprising:
   a directional wireless receiver configured to receive a message within a time period, wherein the message comprises at least one signal comprising a factory reset command from a user device; and
   a controller configured to implement a factory reset of the lighting device if a respective signal of said at least one signal is received within a respective predefined angular range relative to the lighting device.

2. The lighting device according to claim 1, wherein the message comprises only a single signal comprising the factory reset command from the user device;
   wherein the controller is configured to implement the factory reset of the lighting device if said single signal is received within a first predetermined angular range relative to the lighting device.

3. The lighting device according to claim 1, wherein the message comprises a sequence of signals comprising the factory reset command from the user device;
   wherein the controller is configured to implement the factory reset of the lighting device if each respective signal of said sequence of signals is received within the respective predefined angular range relative to the lighting device and according to a predefined sequence of said predefined angular ranges.

4. The lighting device according to claim 3, wherein each consecutive signal of said sequence of signals comprises a different predefined angular range relative to the lighting device.

5. The lighting device according to claim 1, wherein the lighting device comprises a light source for emitting a lighting characteristic;
   wherein the controller is configured to adapt the lighting characteristic of said light source for each instance the respective signal of said sequence of signals is received within the respective predefined angular range relative to the lighting device and according to the predefined sequence of said predefined angular ranges.

6. The lighting device according to claim 1, wherein the time period is one of: one second, two seconds, four seconds, six seconds, at most four seconds, at most ten seconds, or at most twelve seconds.

7. The lighting device according to claim 1, wherein each respective signal of said at least one signal comprises a respective RSSI value;
   wherein the controller is configured to implement the factory reset of the lighting device if each of said respective RSSI value is above a predefined threshold value.

8. The lighting device according to claim 1, wherein the directional wireless receiver is configured to receive the message via ZigBee, Bluetooth, RF, IR, Lo-Ra, UWB, RFID, NFC, Wi-Fi, VLC, and/or Li-Fi.

9. The lighting device according to claim 1, wherein the lighting device comprises a housing, wherein the housing comprises a physical indicator indicative of the respective predefined angular range relative to the lighting device required for implementing the factory reset.

10. The lighting device according to claim 1, wherein the directional wireless receiver is configured to receive an initialization message;
    wherein the controller is configured to start the time period upon the directional wireless receiver receiving said initialization message.

11. A system comprising:
    the lighting device according to claim 1, and
    a user device for providing said message comprising the at least one signal comprising a factory reset command.

12. A method of implementing a factory reset to a lighting device, wherein the method comprises:
    receiving a message within a time period, wherein the message comprises at least one signal comprising a factory reset command from a user device; and
    implementing a factory reset of the lighting device if a respective signal of said at least one signal is received within a respective predefined angular range relative to the lighting device.

13. The method according to claim 12, wherein the message comprises only a single signal comprising the factory reset command from the user device, wherein the method comprises:
    implementing the factory reset of the lighting device if said single signal is received within a first predetermined angular range relative to the lighting device.

14. The method according to claim 13, wherein the message comprises a sequence of signals comprising the factory reset command from the user device, wherein the method comprises:
    implementing the factory reset of the lighting device if each respective signal of said sequence of signals is received within the respective predefined angular range relative to the lighting device and according to a predefined sequence of said predefined angular ranges.

15. A non-transitory computer readable medium storing instructions when executed by one or more processors of a computing device, cause the computing device to perform the method of claim 12.

* * * * *